United States Patent
Kim et al.

(10) Patent No.: US 12,437,381 B2
(45) Date of Patent: Oct. 7, 2025

(54) METHOD AND APPARATUS FOR MULTI-FRAME PREDICTION ERROR-BASED VIDEO ANOMALY DETECTION

(71) Applicant: Industry-Academia Cooperation Group Of Sejong University, Seoul (KR)

(72) Inventors: Young-Gab Kim, Seoul (KR); Yujun Kim, Seoul (KR)

(73) Assignee: Industry-Academia Cooperation Group Of Sejong University, Seoul (KR)

(*) Notice: Subject to any disclaimer, the term of this patent is extended or adjusted under 35 U.S.C. 154(b) by 424 days.

(21) Appl. No.: 18/086,795

(22) Filed: Dec. 22, 2022

(65) Prior Publication Data

US 2023/0267589 A1 Aug. 24, 2023

(30) Foreign Application Priority Data

Feb. 23, 2022 (KR) .......... 10-2022-0023685

(51) Int. Cl.
*G16H 30/40* (2018.01)
*G06N 20/00* (2019.01)
(Continued)

(52) U.S. Cl.
CPC .. *G06T 7/0002* (2013.01); *G06T 2207/10016* (2013.01); *G06T 2207/10024* (2013.01);
(Continued)

(58) Field of Classification Search
CPC ......... G06T 7/0002; G06T 2207/10016; G06T 2207/10024; G06T 2207/30168;
(Continued)

(56) References Cited

U.S. PATENT DOCUMENTS

2005/0265450 A1* 12/2005 Raveendran ......... H04N 19/577
375/E7.256
2024/0249160 A1* 7/2024 Le ........................ G06F 11/34

FOREIGN PATENT DOCUMENTS

CN 109214253 A 1/2019

OTHER PUBLICATIONS

Chen et al., Anomaly detection in surveillance video based on bidirectional prediction, Jun. 2020, Image and Vision Computing, vol. 98, pp. 01-07 (Year: 2020).*

(Continued)

*Primary Examiner* — Amandeep Saini
*Assistant Examiner* — Mehrazul Islam
(74) *Attorney, Agent, or Firm* — David L. Nocilly; Bond Schoeneck & King PLLC

(57) ABSTRACT

Disclosed is a method and apparatus for multi-frame prediction error-based video anomaly detection. The disclosed apparatus for multi-frame prediction error-based video anomaly detection includes a multi-frame predictor configured to predict a current frame and adjacent frames using a prediction model; a multi-frame prediction error obtainer configured to obtain a multi-frame prediction error by obtaining a prediction error of the current frame and prediction errors of the adjacent frames that each prediction error is a difference between a predicted frame and a real frame and by adding the prediction error of the current frame and the prediction errors of the adjacent frames; and an anomaly score evaluator configured to evaluate an anomaly score based on the obtained multi-frame prediction error of the current frame.

10 Claims, 9 Drawing Sheets

(51) Int. Cl.
*G06T 7/00* (2017.01)
*G16H 50/20* (2018.01)

(52) U.S. Cl.
CPC ............... *G06T 2207/30168* (2013.01); *G06T 2207/30232* (2013.01)

(58) Field of Classification Search
CPC . G06T 2207/30232; G06T 2207/20084; G06T 7/254; G08B 13/196; G08B 31/00; G06V 20/52; G06V 10/82; G06N 3/04; G06N 3/08; H04N 7/18
See application file for complete search history.

(56) References Cited

OTHER PUBLICATIONS

"Appearance-Motion Memory Consistency Network for Video Anomaly Detection", Cai, et al. Proceedings of the AAAI Conference on Artificial Intelligence, vol. 35, pp. 938-946, 2021.
Translated KR Office Action, App. No. 10-2022-0023685, dated Jan. 4, 2024, pp. 1-10.
Chen, Dongyue, et al., "Anomaly detection in surveillance video based on bidirectional prediction", Image and Vision Computing, Apr. 13, 2020, vol. 98, Elsevier B.V., https://doi.org/10.1016/j.imavis.2020.103915, pp. 1-8.

\* cited by examiner

FIG. 3

Algorithm 1 Cascade sliding window

Input: multi-frame prediction error $MPE^t_{i,j}$, frame height $h$, frame width $w$, window size $s$, window decrease size $d$
Output: anomaly score $S$ 1: Initialize coordinates $y = h$, coordinates $x$, mean squared error of each patch $mse_k$
2: while true do
3:    $x = \frac{w}{2} - \frac{s}{2}$
4:    $mse_k = \frac{1}{s^2} \sum_{i=y-s}^{y} \sum_{j=x}^{x+s} MPE^t_{i,j}$
5:    while $x > 0$ do
6:      if $x \geq s$ then
7:        $mse_k = \frac{1}{s^2} \sum_{i=y-s}^{y} \sum_{j=x-s}^{x} MPE^t_{i,j}$
8:      else
9:        $mse_k = \frac{1}{s^2} \sum_{i=y-s}^{y} \sum_{j=0}^{x} MPE^t_{i,j}$
10:      end if
11:      $x = x - s$
12:    end while
13:    $x = \frac{w}{2} + \frac{s}{2}$
14:    while $x < w$ do
15:      if $x \leq w - s$ then
16:        $mse_k = \frac{1}{s^2} \sum_{i=y-s}^{y} \sum_{j=x}^{x+s} MPE^t_{i,j}$
17:      else
18:        $mse_k = \frac{1}{s^2} \sum_{i=y-s}^{y} \sum_{j=w-s}^{w} MPE^t_{i,j}$
19:      end if
20:      $x = x + s$
21:    end while
22:    $y = y - s$
23:    if $s - d > 0$ then
24:      $s = s - d$
25:    end if
26:    if $y > 0$ and $y < s$ then
27:      $y = s$
28:    else if $y \leq 0$ then
29:      break
30:    end if
31: end while
32: sort($mse_k$) in ascending order
33: $S = \frac{1}{n} \sum_{i=1}^{n} mse_i$
34: Return $S$

METHOD AND APPARATUS FOR MULTI-FRAME PREDICTION ERROR-BASED VIDEO ANOMALY DETECTION

CROSS-REFERENCE TO RELATED APPLICATION

This application claims the priority benefit of Korean Patent Application No. 10-2022-0023685, filed on Feb. 23, 2022, in the Korean Intellectual Property Office, the disclosure of which is incorporated herein by reference.

BACKGROUND

1. Field of the Invention

The following description of example embodiments relates to a method and apparatus for multi-frame prediction error-based video anomaly detection.

2. Description of the Related Art

According to an increase in the number of video surveillance systems, the number of video surveillance systems to be controlled by each closed-circuit television (CCTV) operator is also increasing. This causes a CCTV operator to miss out an abnormal event (e.g., robbery, violence, murder, etc.) that occurs in a video surveillance system, which may lead to a serious problem. Therefore, study on improving control efficiency by automatically detecting an abnormal event that occurs in a video surveillance system and by notifying a CCTV operator of the occurrence of the abnormal event is becoming important.

SUMMARY

Example embodiments provide a method and apparatus for multi-frame prediction error-based video anomaly detection for improving control efficiency by detecting an abnormal event that occurs in a video surveillance system with high accuracy and by notifying a closed-circuit television (CCTV) operator of the occurrence of the abnormal event. Example embodiments may improve an abnormal event detection accuracy using a deep learning-based prediction model for automatically detecting an abnormal event that occurs in a video surveillance system and using a prediction error of a current frame and prediction errors of adjacent frames when detecting an abnormal event of the current frame.

According to an aspect, there is provided a multi-frame prediction error-based video anomaly detection apparatus including a multi-frame predictor configured to predict a current frame and adjacent frames using a prediction model; a multi-frame prediction error obtainer configured to obtain a multi-frame prediction error by obtaining a prediction error of the current frame and prediction errors of the adjacent frames that each prediction error is a difference between a predicted frame and a real frame and by adding the prediction error of the current frame and the prediction errors of the adjacent frames.

To predict the current frame and the adjacent frames, the multi-frame predictor may be configured to predict the current frame and the adjacent frames by receiving and concatenating a previous frame and a next frame as color through two sub-networks for each of the current frame and the adjacent frames.

The multi-frame prediction error obtainer may be configured to obtain prediction errors for the current frame and the adjacent frames by squaring a pixel difference between the predicted frame and the real frame for each frame and to obtain a multi-frame prediction error that is a sum of the prediction error of the current frame and the prediction errors of the adjacent frames to reduce an incorrect prediction error gap.

The multi-frame prediction error obtainer may be configured to obtain a multi-frame prediction error for the current frame by multiplying the prediction error by a weight for reducing influence of a prediction error of a corresponding adjacent frame on anomaly detection of the current frame as a distance between the adjacent frame and the current frame increases and then summing each weight-multiplied prediction error.

An equation for calculating the multi-frame prediction error $MPE_{i,j}^t$ may be represented as follows:

$$MPE_{i,j}^t = \sum_{k=t-n}^{t+n} w^{|k-t|} \cdot PE_{i,j}^t$$

Here, t denotes a time, w denotes a weight, and $PE_{i,j}^t$ denotes a prediction error.

The anomaly score evaluator may be configured to obtain the anomaly score for the current frame using a cascade sliding window method for the obtained multi-frame prediction error.

The cascade sliding window method may move a single window in the multi-frame prediction error and may calculate a mean for a patch of the multi-frame prediction error corresponding to the window every time the window moves, and after moving the window evenly in both sides of the entire multi-frame prediction error, may calculate the anomaly score by selecting and averaging a portion of the calculated mean.

According to another aspect, there is provided a multi-frame prediction error-based video anomaly detection method including predicting, by a multi-frame predictor, a current frame and adjacent frames using a prediction model; obtaining, by a multi-frame prediction error obtainer, multi-frame prediction error by obtaining a prediction error of the current frame and prediction errors of the adjacent frames that each prediction error is a difference between a predicted frame and a real frame and by adding the prediction error of the current frame and the prediction errors of the adjacent frames; and evaluating, by an anomaly score evaluator, an anomaly score based on the obtained multi-frame prediction error of the current frame.

A method and apparatus for multi-frame prediction error-based video anomaly detection according to example embodiments may improve control efficiency by detecting an abnormal event that occurs in a video surveillance system with high accuracy and by notifying a CCTV operator of the occurrence of the abnormal event. According to example embodiments, it is possible to improve an abnormal event detection accuracy using a deep learning-based prediction model for automatically detecting an abnormal event that occurs in a video surveillance system and using a prediction error of a current frame and prediction errors of adjacent frames when detecting an abnormal event of the current frame.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

These and/or other aspects, features, and advantages of the invention will become apparent and more readily appreciated from the following description of embodiments, taken in conjunction with the accompanying drawings of which:

FIG. 3 illustrates an example of an algorithm for anomaly score evaluation according to an example embodiment;

DETAILED DESCRIPTION

Example embodiments relate to using a deep learning-based prediction model for automatically detecting an abnormal event that occurs in a video surveillance system and more particularly, to using a prediction error of a current frame and prediction errors of adjacent frames when detecting an abnormal event of the current frame.

The example embodiments evaluated performance in Ped2 and Avenue datasets used for performance evaluation in anomaly detection study and achieved outstanding frame-level area under the curve (AUC) 99.1% and 93.0% in Ped2 and Avenue datasets, respectively, and confirmed that outstanding anomaly detection accuracy is acquired compared to the existing state-of-the-art technology. Hereinafter, the example embodiments are described with reference to the accompanying drawings.

Figure 1:
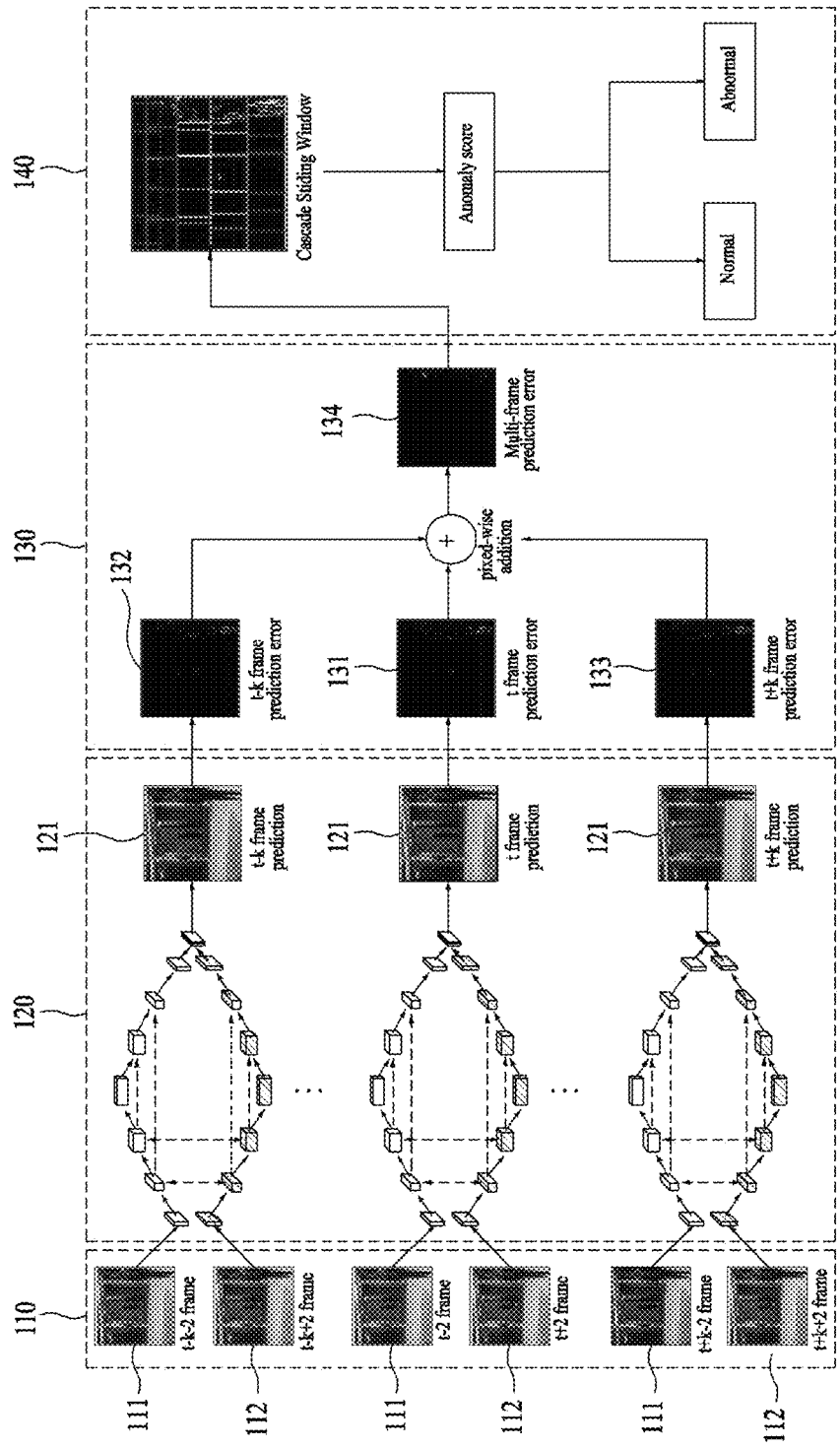
FIG. 1 illustrates an example of a configuration of a multi-frame prediction error-based video anomaly detection apparatus according to an example embodiment.

FIG. 1 illustrates an example of a configuration of a multi-frame prediction error-based video anomaly detection apparatus according to an example embodiment.

The multi-frame prediction error-based video anomaly detection apparatus includes an inputter 110, a multi-frame predictor 120, a multi-frame prediction error obtainer 130, and an anomaly score evaluator 140.

The multi-frame predictor 120 according to an example embodiment predicts a current frame and adjacent frames using a prediction model.

The multi-frame predictor 120 predicts the current frame and the adjacent frames in such a manner that the inputter 110 receives and concatenates a previous frame and a next frame in color through two sub-networks for each of the current frame and the adjacent frames in order to predict the current frame and the adjacent frames. The multi-frame predictor 120 according to an example embodiment may predict the current frame and the adjacent frames using a Cross U-Net model.

According to an example embodiment, a Cross U-Net model configured to receive an input of a previous frame 111 and a next frame 112 and to predict a current frame 121 is used to predict a current frame and adjacent frames (t−k, . . . , t−2, t−1, t, t+1, t+2, . . . , t+k).

Figure 2:
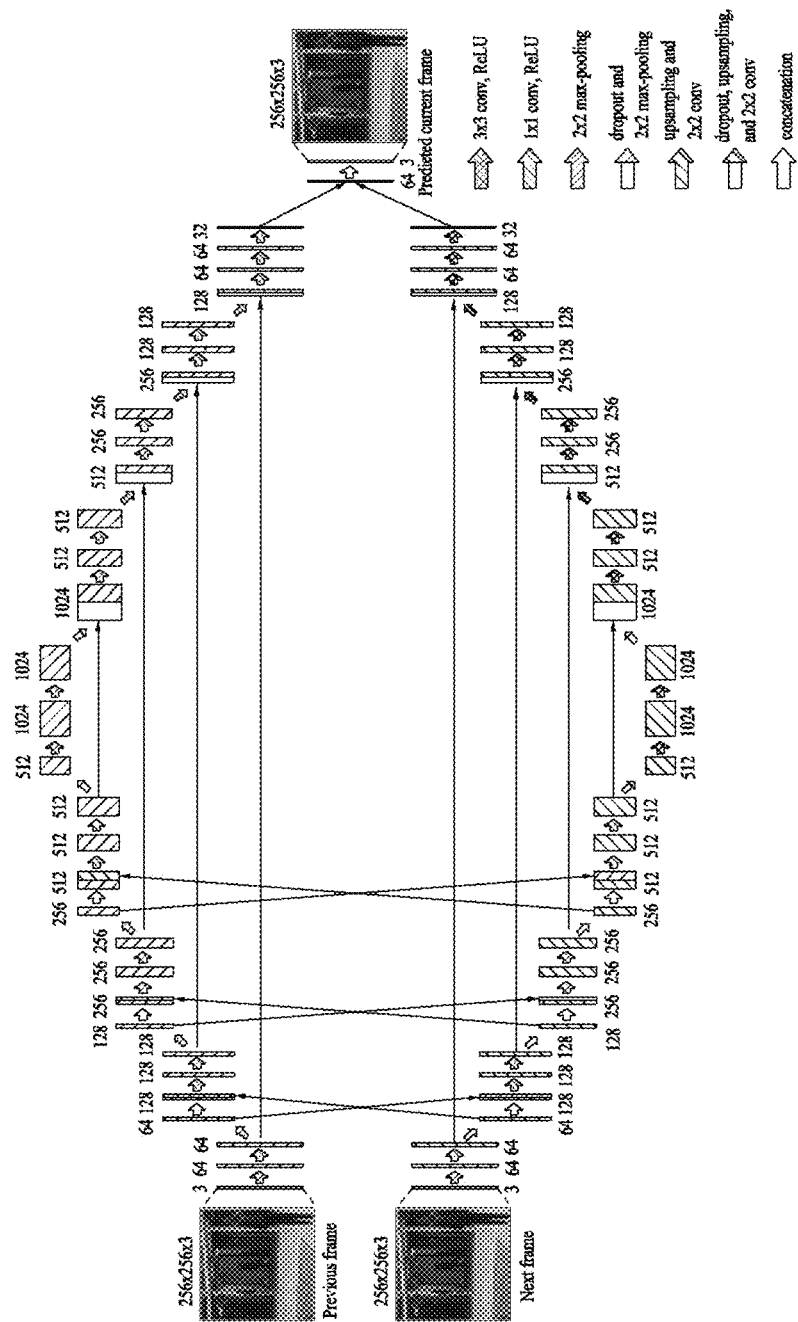
FIG. 2 illustrates an example of a multi-frame prediction model according to an example embodiment.

FIG. 2 illustrates an example of a multi-frame prediction model according to an example embodiment.

To obtain more features in input previous and next frames, as shown in FIG. 2, the existing Cross U-Net model receives the previous frame and the next frame in color and changes the number of channels of a feature map from 2 to 32 before concatenation of two sub-networks.

A loss function used by the Cross U-Net model according to an example embodiment is a pixel-wise mean squared error, which is given by:

$$L(\hat{F}_{i,j} - F_{i,j}) = \frac{1}{h \cdot w} \sum_{i=1}^{h} \sum_{j=1}^{w} (\hat{F}_{i,j} - F_{i,j})^2 \quad (1)$$

$\hat{F}_{i,j}$ denotes a predicted frame and $F_{i,j}$ denotes a real frame. h denotes a height of a frame and w denotes a width of the frame. After training the Cross U-Net model, the example embodiment predicts the current frame and the adjacent frames using the trained Cross U-Net model.

The multi-frame prediction error obtainer 130 according to an example embodiment obtains a prediction error that is a difference between a predicted frame and a real frame for each of the current frame and the adjacent frames and adds a prediction error of the current frame and prediction errors of the adjacent frames.

The multi-frame prediction error obtainer 130 according to an example embodiment obtains prediction errors for the current frame and the adjacent frames by squaring a pixel difference between the predicted frame and the real frame for each frame. To reduce an incorrect prediction error gap, the multi-frame prediction error obtainer 130 obtains a multi-frame prediction error that is a sum of the prediction error of the current frame and the prediction errors of the adjacent frames.

The multi-frame prediction error obtainer 130 obtains a multi-frame prediction error for the current frame by multiplying the prediction error by a weight for reducing influence of a prediction error of a corresponding adjacent frame on anomaly detection of the current frame as a distance between the adjacent frame and the current frame increases and then summing each weight-multiplied prediction error.

After predicting the current frame and the adjacent frame, the example embodiment calculates the prediction error $PE_{i,j}^{t}$ 131, 132, 133 that is the square of the difference between the real frame of each predicted frame and the predicted frame. Here, $PE_{i,j}^{t}$ may be given by:

$$PE_{i,j}^{t} = \sum_{i=1}^{h} \sum_{j=1}^{w} (\hat{F}_{ij}^{t} - F^{tij})^2 \quad (2)$$

Here, t denotes a time and $PE_{i,j}^{t}$ becomes a single image. A pixel in $PE_{i,j}^{t}$ refers to a corresponding pixel difference between the real frame and the predicted frame. Therefore, a pixel with a large value in $PE_{i,j}^{t}$ represents that the pixel has a high probability of an abnormal event, that is, anomaly.

Here, due to performance of a prediction model, background noise of input frames, and the like, some normal pixels may have large values or some abnormal pixels may have small values. To reduce the incorrect prediction error gap, the example embodiment uses a multi-frame prediction error $MPE_{i,j}^t$ 134 that is a sum of the prediction error 131 of the current frame and the prediction errors 132 and 133 of the adjacent frames. $PE_{i,j}^t$ may be formulated as follows:

$$MPE_{i,j}^t = \sum_{k=t-n}^{t+n} w^{|k-t|} \cdot PE_{i,j}^t \quad (3)$$

Here, t denotes a time, w denotes a weight, and $PE_{i,j}^t$ denotes a prediction error. The weight is used to decrease the influence of the current frame on anomaly detection as the distance between the adjacent frame and the current frame increases.

The anomaly score evaluator 140 according to an example embodiment evaluates an anomaly score based on the obtained multi-frame prediction error of the current frame.

The anomaly score evaluator 140 according to an example embodiment obtains the anomaly score for the current frame using a cascade sliding window method for the obtained multi-frame prediction error.

The cascade sliding window method according to an example embodiment moves a single window in the multi-frame prediction error and calculates a mean for a patch of the multi-frame prediction error corresponding to the window every time the window moves. Here, after moving the window evenly in both sides of the entire multi-frame prediction error, the cascade sliding window method calculates the anomaly score by selecting and averaging a portion of the calculated mean.

FIG. 3 illustrates an example of an algorithm for anomaly score evaluation according to an example embodiment.

According to an example embodiment, the anomaly score is used to infer anomaly of a current frame and a high anomaly score represents that the current frame includes anomaly with high probability. The example embodiment uses a cascade sliding window method with a new algorithm to obtain the anomaly score. The cascade sliding window method moves a single window in $MPE_{i,j}^t$ and calculates a mean of a patch of $MPE_{i,j}^t$ corresponding to the window every time the window moves. A key of the cascade sliding window method is decreasing a window size when the window moves from bottom to up. The cascade sliding window method considers that a size of an object becomes smaller according to an increase in a distance between the object and a camera. After the window moves the entire $MPE_{i,j}^t$, the cascade sliding window method calculates the anomaly score by selecting and averaging some large mean. However, since the existing cascade sliding window method does not enable windows to move evenly in the left and the right of $MPE_{i,j}^t$, it causes a difference in the anomaly score according to a location of corresponding anomaly. Accordingly, the example embodiment uses an algorithm of FIG. 3 such that the window moves evenly in both directions of $MPE_{i,j}^t$.

In Algorithm 1 of FIG. 3 according to an example embodiment, a width and a height of a frame are represented as w and h, respectively, a size of a window is represented as s, and a window decrease size is represented as d.

Algorithm 1 operates as follows:
1. Move the window from the bottom-middle to the bottom-left of $MPE_{i,j}^t$ by s.
2. Every time the window moves, obtain a mean $mean_k$ for a patch of corresponding to the window.
3. If the window reaches the bottom-left, place the window on the bottom-middle again and then move the window to the bottom-right by s.
4. If the window reaches the bottom-right, place the window on the bottom-middle and then move the window up by s.
5. Decrease a size of the window by d.
6. Move the window again by s until the window reaches the left side.
7. Repeat the above actions until the window reaches the top-right.
8. If the window reaches the top-right, sort $mean_k$ in ascending order and then select n patches from the front of $mean_k$.
9. Average the selected patches and use the mean as anomaly score S.
10. If the window does not reach the left side due to a lack of the remaining space of, move the x-coordinate of the window to x=s as in the $9^{th}$ line of Algorithm 1.
11. If the window does not reach the right side due to a lack of the remaining space of $MPE_{i,j}^t$, move the x-coordinate of the window to x=w−s as in the $18^{th}$ line of Algorithm 1.
12. If the window does not reach the top-side due to a lack of the remaining space of $MPE_{i,j}^t$, move the y-coordinate of the window to y=s as in the $27^{th}$ line of Algorithm 1.

Figure 4:
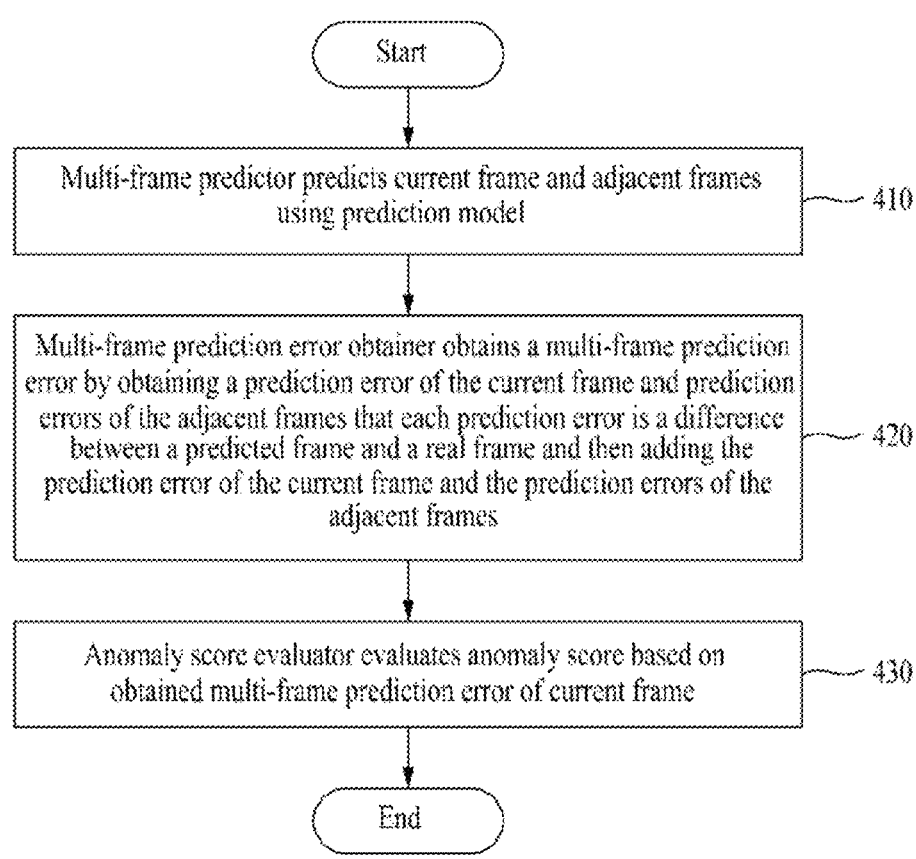
FIG. 4 is a flowchart illustrating an example of a multi-frame prediction error-based video anomaly detection method according to an example embodiment.

FIG. 4 is a flowchart illustrating an example of a multi-frame prediction error-based video anomaly detection method according to an example embodiment.

The proposed multi-frame prediction error-based video anomaly detection method includes operation 410 of predicting, by a multi-frame predictor, a current frame and adjacent frames using a prediction model, operation 420 of obtaining, by a multi-frame prediction error obtainer, a multi-frame prediction error by obtaining a prediction error of the current frame and prediction errors of the adjacent frames that each prediction error is a difference between a predicted frame and a real frame and then adding the prediction error of the current frame and the prediction errors of the adjacent frames, and operation 430 of evaluating, by an anomaly score evaluator, an anomaly score based on the obtained multi-frame prediction error of the current frame.

In operation 410, the multi-frame predictor predicts the current frame and the adjacent frames using the prediction model.

The multi-frame predictor according to an example embodiment predicts the current frame and the adjacent frames in such a manner that an inputter receives and concatenates a previous frame and a next frame in color through two sub-networks for each of the current frame and the adjacent frames in order to predict the current frame and the adjacent frames. The multi-frame predictor according to an example embodiment may predict the current frame and the adjacent frames using a Cross U-Net model.

In operation 420, the multi-frame prediction error obtainer obtains the multi-frame prediction error by obtaining the prediction error that is the difference between the predicted frame and the real frame for each of the current frame and the adjacent frames and by adding the prediction error of the current frame and the prediction errors of the adjacent frames.

The multi-frame prediction error obtainer obtains the prediction error that is the difference between the predicted frame and the real frame for each of the current frame and the adjacent frames and adds the prediction error of the current frame and the prediction errors of the adjacent frames.

The multi-frame prediction error obtainer according to an example embodiment obtains a prediction error for the current frame and the adjacent frames by squaring a pixel difference between the predicted frame and the real frame for each frame. To reduce an incorrect prediction error gap, the multi-frame prediction error obtainer obtains a multi-frame prediction error that is a sum of the prediction error of the current frame and the prediction errors of the adjacent frames.

The multi-frame prediction error obtainer according to an example embodiment obtains a multi-frame prediction error for the current frame by multiplying the prediction error by a weight for reducing influence of a prediction error of a corresponding adjacent frame on anomaly detection of the current frame as a distance between the adjacent frame and the current increases and then summing each weight-multiplied prediction error.

In operation 430, the anomaly score evaluator evaluates the anomaly score based on the obtained multi-frame prediction error of the current frame.

The anomaly score evaluator according to an example embodiment evaluates the anomaly score based on the obtained multi-frame prediction error of the current frame.

The anomaly score evaluator according to an example embodiment obtains the anomaly score for the current frame using a cascade sliding window method for the obtained multi-frame prediction error.

The cascade sliding window method according to an example embodiment moves a single window in the multi-frame prediction error and calculates a mean for a patch of the multi-frame prediction error corresponding to the window every time the window moves. Here, after moving the window evenly in both sides of the entire multi-frame prediction error, the cascade sliding window method calculates the anomaly score by selecting and averaging a portion of the calculated mean.

To test an anomaly detection accuracy according to an example embodiment, UCSD Ped2 and CUHK Avenue datasets that are datasets used in existing anomaly detection research are used. Features of each dataset are described below.

Ped2 provides 16 training videos and 12 testing videos. A resolution of each video is 360×240 pixels and a frame rate is 10 fps. This dataset defines a person riding a bicycle or a skateboard, a vehicle, and the like, as an abnormal event, that is, anomaly.

Avenue provides 16 training videos and 21 testing videos. A resolution of each video is 640×360 pixels and a frame rate is 25 fps. This dataset defines an abnormal action such as throwing papers, movement in a wrong direction, and an abnormal object such as a bicycle, as anomaly.

To measure performance according to an example embodiment, a frame-level area under the curve (AUC) was used. AUC represents an area under a receiver operation characteristic (ROC). In an example embodiment, the ROC may be obtained by changing an anomaly score threshold about an abnormal event.

Experiments according to an example embodiment were implemented using Python and an OpenCV library was used to convert a video to a color image of 256×256 pixels in a data preprocessing process. When resizing the image, INTER_CUBIC interpolation was used at the Ped2 dataset and INTER_AREA interpolation was used at the Avenue dataset. PyTorch was used to train and test a Cross U-Net model. The Cross U-Net model used bicubic interpolation at an upsampling layer and used an Adam optimizer with a learning rate of 0.001 for training.

The example embodiments evaluated the performance in the range of adjacent frames from 0 to 15 in Ped2 and from 0 to 60 in Avenue and evaluated the performance using a that is a weighted value of a prediction error about a corresponding adjacent frame in the range {1, 0.95, 0.9, 0.85, 0.8, 0.75}. When using the cascade sliding window method, a window size from 16 to 64 and a decrease size from 0 to 4 were used.

Figure 5:
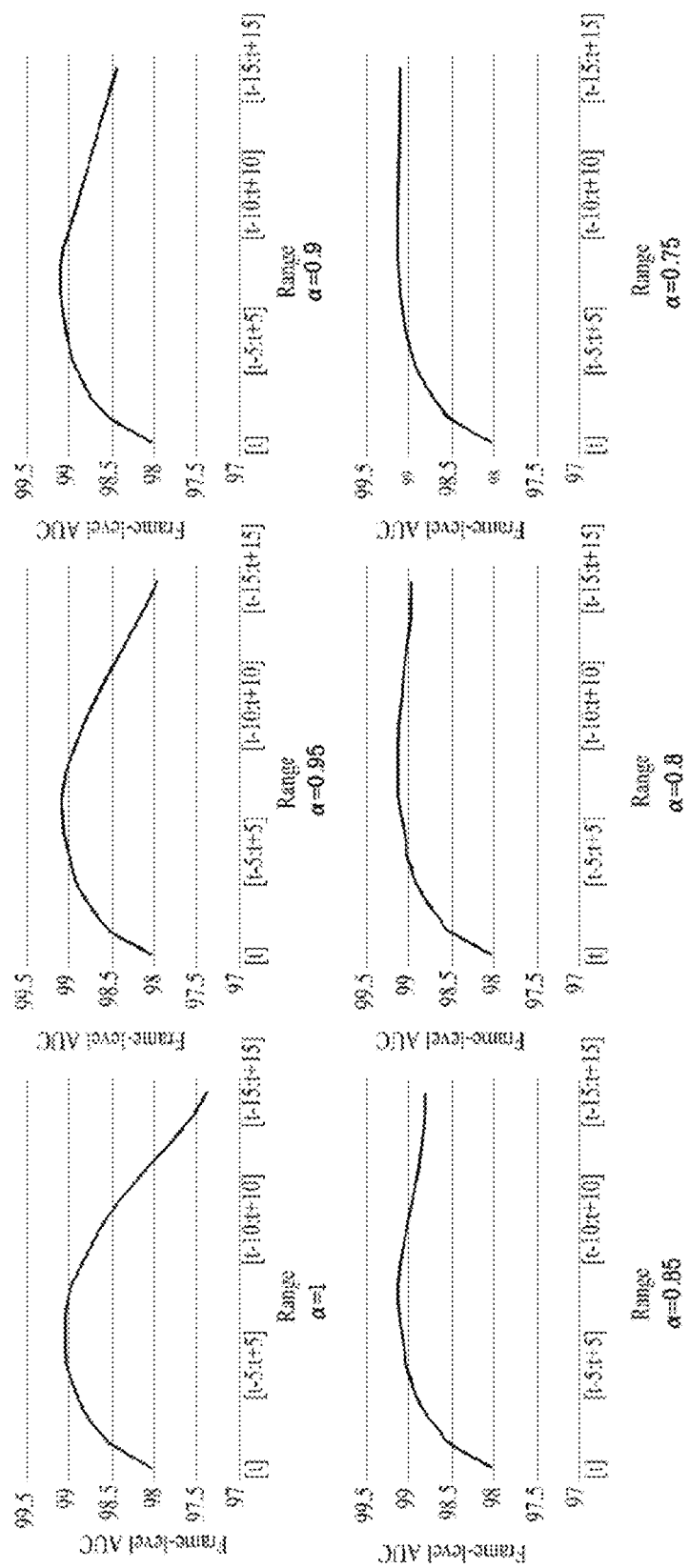
FIG. 5 illustrates an example of Ped2 experimental results according to an example embodiment.

FIG. 5 illustrates an example of Ped2 experimental results according to an example embodiment.

Referring to FIG. 5, the results show that the frame-level AUC gradually increases as $\alpha$ decreases from 1 to 0.75. Also, the results show that the frame-level AUC difference according to an increase in the range of adjacent frames decreases as $\alpha$ decreases. The example embodiments obtain the highest frame-level AUC of 99.14% when $\alpha$ is 0.75, the range of adjacent frames is [t−8:t+8], the window size is 31, the decrease size is 2, and the patch number is 1. This frame-level AUC is highest compared to the performance of state-of-the-art methods of Table 1 and is a 1% higher frame-level AUC than Zaheer et al., which previously achieved the highest AUC in Ped2.

TABLE 1

| Method | Ped2 | Avenue |
|---|---|---|
| ConvLSTM-AE [20] | 88.1 | 77.0 |
| Conv-AE [12] | 90.0 | 70.2 |
| AMDN [38] | 90.8 | N/A |
| sRNN [21] | 92.2 | 81.7 |
| sRNN-AE [22] | 92.2 | 83.5 |
| Ravanbakhsh et al. [29] | 93.5 | N/A |
| AnomalyNet [45] | 94.9 | 86.1 |
| Liu et al. [17] | 95.4 | 84.9 |
| Tang et al. [34] | 96.2 | 83.7 |
| Lu et al. [19] | 96.2 | 85.8 |
| Nguyen et al. [26] | 96.2 | 86.9 |
| ROADMAP [36] | 96.3 | 88.3 |
| Chang et al. [3] | 96.5 | 86.0 |
| STAN [16] | 96.5 | 87.2 |
| Chen et al. [3] | 96.6 | 87.8 |
| AMMC-Net [2] | 96.6 | 86.6 |
| Park et al. [27] | 97.0 | 88.5 |
| AEP [40] | 97.3 | 90.2 |
| Georgescu et al. [11] | 97.5 | 91.5 |
| Zaheer et al. [41] | 98.1 | N/A |
| MPE | 99.1 | 93.0 |

Figure 6:
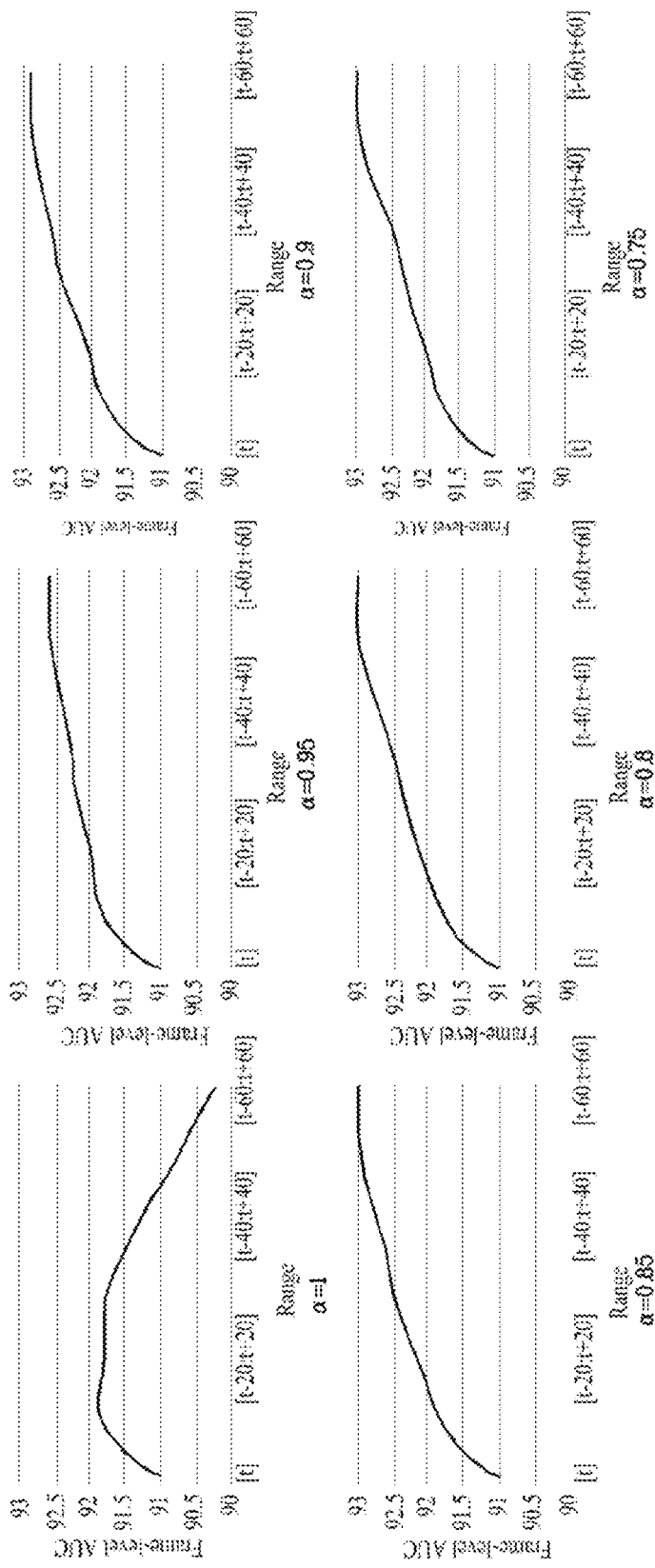
FIG. 6 illustrates an example of Avenue experimental results according to an example embodiment.

FIG. 6 illustrates an example of Avenue experimental results according to an example embodiment.

Similar to FIG. 5, the example embodiments obtain the highest frame-level AUC of 93.01% when $\alpha$ is 0.8, the range of adjacent frames is [t−54:t+54], the window size is 36, the decrease size is 2, and the patch number is 13. The results show that $\alpha$ prevents a severe decrease of the frame-level AUC when the range of adjacent frames increases. When the highest frame-level AUC obtained in Avenue is compared to state-of-the art methods of Table 1, the example embodiments have the highest value and obtain a 1.5% higher frame-level AUC than Georgescu et al., which previously achieved the highest AUC in Avenue.

Figure 7:
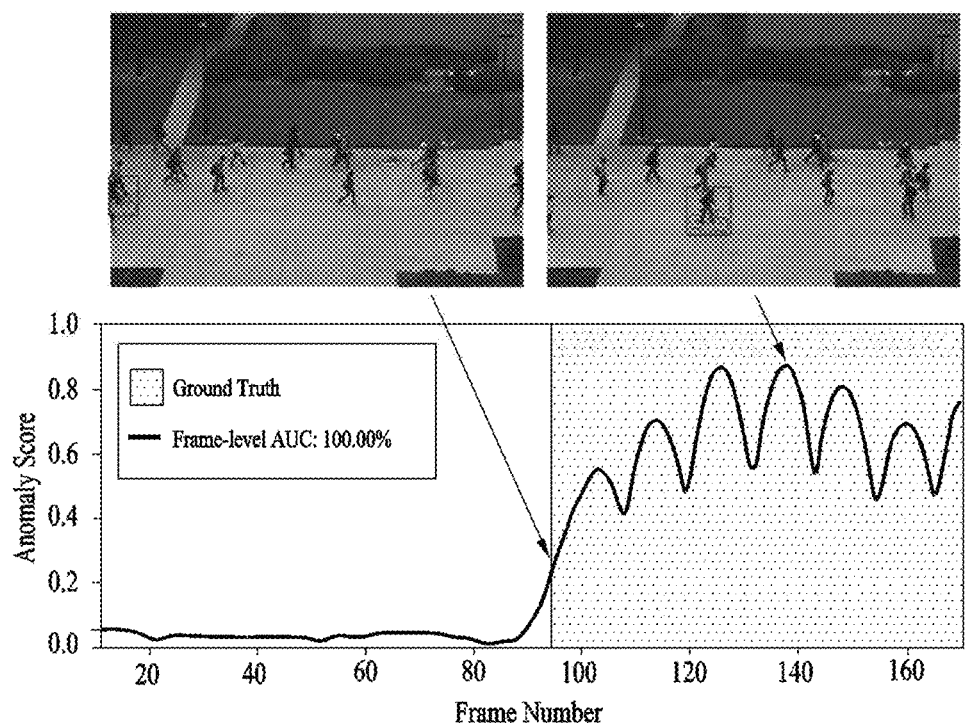
FIG. 7 illustrates an example of anomaly score and anomaly localization for test video Test002 in Ped2 according to an example embodiment.

FIG. 7 illustrates an example of anomaly score and anomaly localization for test video Test002 in Ped2 according to an example embodiment.

For detailed analysis of the example embodiments, the anomaly score, ground truth, and frame-level AUC for each video in Ped2 and Avenue are visualized. Referring to FIG. 7, the example embodiments obtain the frame-level AUC of 100% in test video Test002 of Ped2 and it can be seen that a difference in the anomaly score between a normal frame and an abnormal frame is distinct.

Figure 8:
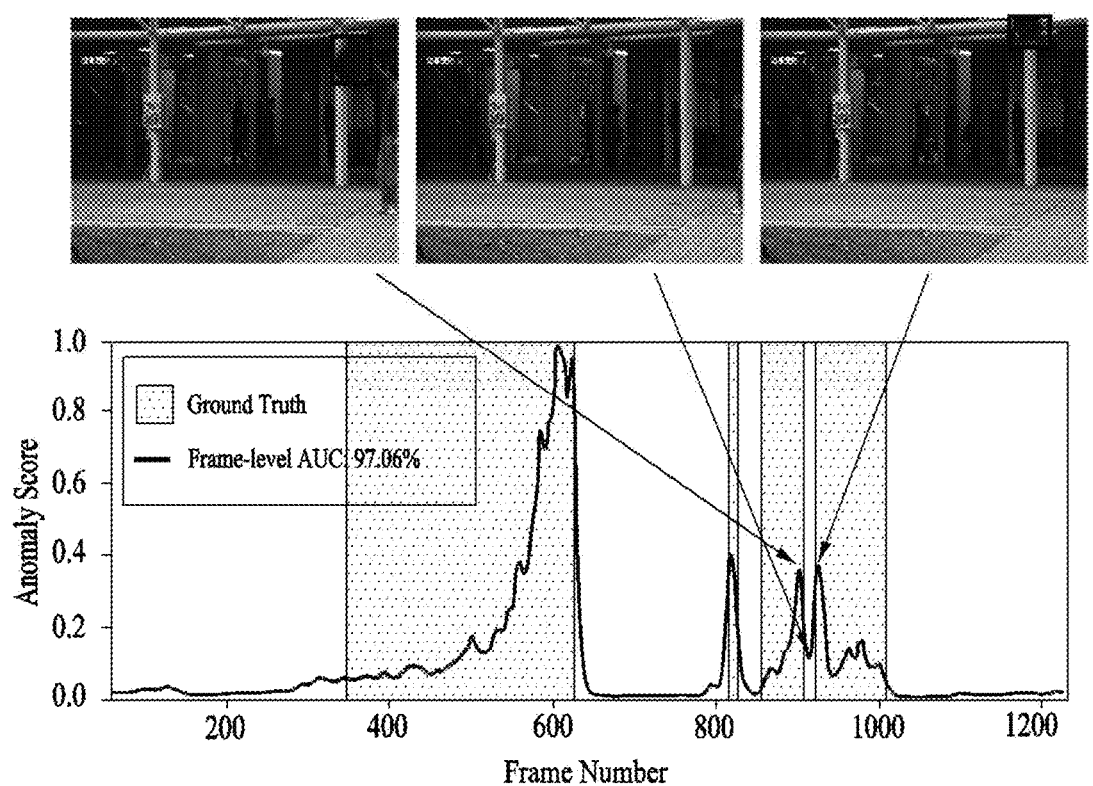
FIG. 8 illustrates an example of anomaly score and anomaly localization for test video 06 in Avenue according to an example embodiment.

FIG. 8 illustrates an example of anomaly score and anomaly localization for test video 06 in Avenue according to an example embodiment.

Referring to FIG. 8, the example embodiments obtain the frame-level AUC of 97.06% in the test video 06 of Avenue and it can be seen that a normal frame has a significantly high anomaly score when adjacent frames are abnormal frames with high abnormal score.

Figure 9:
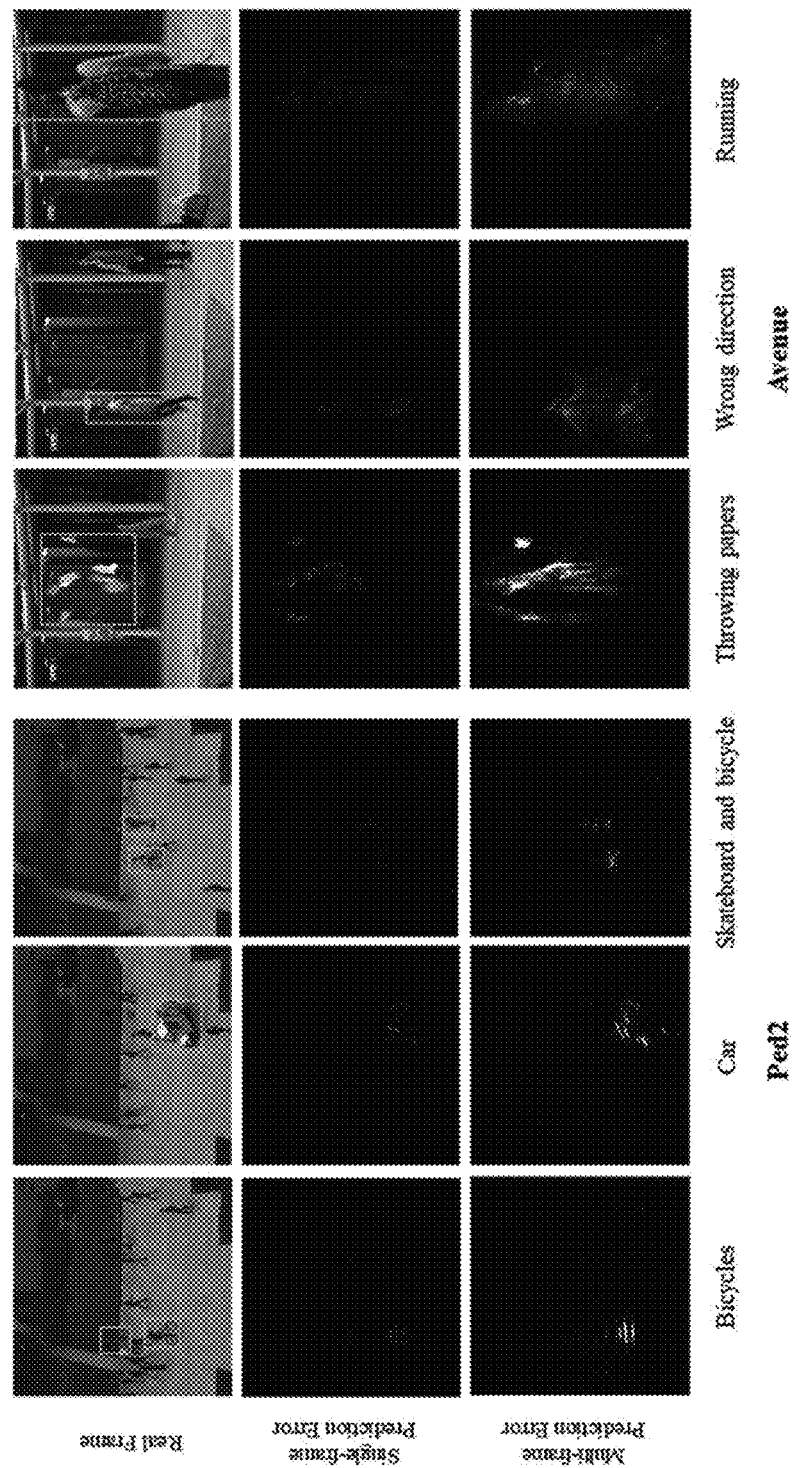
FIG. 9 illustrates an example of visualization of a real frame, a single-frame prediction error, and a multi-frame prediction error according to an example embodiment.

FIG. 9 illustrates an example of visualization of a real frame, a single-frame prediction error, and a multi-frame prediction error according to an example embodiment.

Referring to FIG. 9, the example embodiments visualized a real frame about abnormal frames, a single-frame prediction error in which prediction errors of adjacent frames are not used, and a multi-frame prediction error. The visualization shows that the multi-frame prediction error makes a distinct difference between a normal part and an abnormal part in an abnormal frame.

The systems and/or apparatuses described herein may be implemented using hardware components, software components, and/or a combination thereof. For example, apparatuses and components described herein may be implemented using one or more general-purpose or special purpose computers, such as, for example, a processor, a controller, an arithmetic logic unit (ALU), a digital signal processor, a microcomputer, a field programmable array (FPA), a programmable logic unit (PLU), a microprocessor, or any other device capable of responding to and executing instructions in a defined manner. A processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciate that the processing device may include multiple processing elements and/or multiple types of processing elements. For example, the processing device may include multiple processors or a processor and a controller. In addition, different processing configurations are possible, such as parallel processors.

The software may include a computer program, a piece of code, an instruction, or some combinations thereof, for independently or collectively instructing or configuring the processing device to operate as desired. Software and/or data may be embodied permanently or temporarily in any type of machine, component, physical equipment, virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable storage mediums.

The methods according to the example embodiments may be recorded in non-transitory computer-readable media including program instructions to implement various operations embodied by a computer. Also, the media may include, alone or in combination with the program instructions, data files, data structures, and the like. The program instructions recorded in the media may be specially designed for the example embodiments or may be known to those skilled in the computer software art and thereby available. Examples of non-transitory computer-readable media include magnetic media such as hard disks, floppy disks, and magnetic tape; optical media such as CD ROM and DVD; magneto-optical media such as floptical disks; and hardware devices that are specially to store and perform program instructions, such as read-only memory (ROM), random access memory (RAM), flash memory, and the like. Examples of the program instructions include a machine language code such as produced by a compiler and an advanced language code executable by a computer using an interpreter.

While this disclosure includes specific example embodiments, it will be apparent to one of ordinary skill in the art that various alterations and modifications in form and details may be made in these example embodiments without departing from the spirit and scope of the claims and their equivalents. For example, suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A video anomaly detection apparatus comprising:
 a multi-frame predictor configured to predict a current frame and adjacent frames using a prediction model;
 a multi-frame prediction error obtainer configured to obtain a multi-frame prediction error by obtaining a prediction error of the current frame and prediction errors of the adjacent frames that each prediction error is a difference between a predicted frame and a real frame and by adding the prediction error of the current frame and the prediction errors of the adjacent frames; and
 an anomaly score evaluator configured to evaluate an anomaly score based on the obtained multi-frame prediction error of the current frame,
 wherein the anomaly score evaluator is configured to
 obtain the anomaly score for the current frame by using a cascade sliding window method for the obtained multi-frame prediction error,
 perform, when moving the window, a movement process for the window such that the window moves evenly in both directions, by moving the window from bottom center to bottom left of the multi-frame prediction error by the size of the window,
 each time the window moves, obtain a mean value for a patch of the multi-frame prediction error corresponding to the window, when the window reaches the bottom left, reposition the window at the bottom center, then move the window to bottom right of the multi-frame prediction error by the size of the window, and when the window reaches the bottom right, reposition the window at the bottom center again and then move the window upward by the size of the window, then decrease the size of the window by a predetermined amount, repeatedly perform the movement process for the window, and in response that the window reaches top right of the multi-frame prediction error, sort mean values for patches of the multi-frame prediction error corresponding to the window, obtained each time the window moves, in ascending order, select a predetermined number of patches from the sorted ascending mean values, and average the selected patches to use as the anomaly score, and during the movement process for the window, move a x-coordinate of the window to x=the size of the window(s) in response to the window being unable to reach left side of the multi-frame prediction error due to insufficient remaining space of the multi-frame prediction error, move the x-coordinate of the window to x=a width of the frame (w)–the size of the window(s) in response to the window being unable to reach right side of the multi-frame prediction error due to insufficient remaining space of the multi-frame prediction error, and move a y-coordinate of the window to y=the size of the window(s) in response to the window being unable to reach top side of the multi-frame prediction error due to insufficient remaining space of the multi-frame prediction error.

2. The video anomaly detection apparatus of claim 1, wherein, to predict the current frame and the adjacent frames, the multi-frame predictor is configured to predict the current frame and the adjacent frames by receiving and concatenating a previous frame and a next frame in color through two sub-networks for each of the current frame and the adjacent frames.

3. The video anomaly detection apparatus of claim 1, wherein the multi-frame prediction error obtainer is configured to obtain prediction errors for the current frame and the adjacent frames by squaring a pixel difference between the predicted frame and the real frame for each frame and to obtain a multi-frame prediction error that is a sum of the prediction error of the current frame and the prediction errors of the adjacent frames to reduce an incorrect prediction error gap.

4. The video anomaly detection apparatus of claim 3, wherein the multi-frame prediction error obtainer is configured to obtain a multi-frame prediction error for the current frame by multiplying the prediction error by a weight for reducing influence of a prediction error of a corresponding adjacent frame on anomaly detection of the current frame as a distance between the adjacent frame and the current frame increases and then summing each weight-multiplied prediction error.

5. The video anomaly detection apparatus of claim 4, wherein an equation for calculating the multi-frame prediction error $MPE_{i,j}^t$ is represented as follows:

$$MPE_{i,j}^t = \sum_{k=t-n}^{t+n} w^{|k-t|} \cdot PE_{i,j}^t$$

where t denotes a time, w denotes a weight, and $PE_{i,j}^t$ denotes a prediction error.

6. A video anomaly detection method comprising:

predicting, by a multi-frame predictor, a current frame and adjacent frames using a prediction model;

obtaining, by a multi-frame prediction error obtainer, a multi-frame prediction error by obtaining a prediction error of the current frame and prediction errors of the adjacent frames that each prediction error is a difference between a predicted frame and a real frame and by adding the prediction error of the current frame and the prediction errors of the adjacent frames; and evaluating, by an anomaly score evaluator, an anomaly score based on the obtained multi-frame prediction error of the current frame, wherein the evaluating of the anomaly score comprises obtaining the anomaly score for the current frame by using a cascade sliding window method for the obtained multi-frame prediction error, performing, when moving the window, a movement process for the window such that the window moves evenly in both directions, by moving the window from bottom center to bottom left of the multi-frame prediction error by the size of the window, each time the window moves, obtaining a mean value for a patch of the multi-frame prediction error corresponding to the window, when the window reaches the bottom left, repositioning the window at the bottom center, then moving the window to bottom right of the multi-frame prediction error by the size of the window, and when the window reaches the bottom right, repositioning the window at the bottom center again and then moving the window upward by the size of the window, then decreasing the size of the window by a predetermined amount, repeatedly performing the movement process for the window, and in response that the window reaches top right of the multi-frame prediction error, sorting mean values for patches of the multi-frame prediction error corresponding to the window, obtained each time the window moves, in ascending order, selecting a predetermined number of patches from the sorted ascending mean values, and averaging the selected patches to use as the anomaly score, and during the movement process for the window, moving a x-coordinate of the window to x=the size of the window(s) in response to the window being unable to reach left side of the multi-frame prediction error due to insufficient remaining space of the multi-frame prediction error, moving the x-coordinate of the window to x=a width of the frame (w)–the size of the window(s) in response to the window being unable to reach right side of the multi-frame prediction error due to insufficient remaining space of the multi-frame prediction error, and moving a y-coordinate of the window to y=the size of the window(s) in response to the window being unable to reach top side of the multi-frame prediction error due to insufficient remaining space of the multi-frame prediction error.

7. The video anomaly detection method of claim 6, wherein the predicting comprises predicting the current frame and the adjacent frames by receiving and concatenating a previous frame and a next frame as color through two sub-networks for each of the current frame and the adjacent frames.

8. The video anomaly detection method of claim 6, wherein the obtaining comprises obtaining prediction errors for the current frame and the adjacent frames by squaring a pixel difference between the predicted frame and the real frame and obtaining a multi-frame prediction error that is a sum of the prediction error of the current frame and the prediction errors of the adjacent frames to reduce an incorrect prediction error gap.

9. The video anomaly detection method of claim 8, wherein the obtaining comprises obtaining a multi-frame prediction error for the current frame by multiplying the prediction error by a weight for reducing influence of a prediction error of a corresponding adjacent frame on anomaly detection of the current frame as a distance between the adjacent frame and the current frame increases and then summing each weight-multiplied prediction error.

10. The video anomaly detection method of claim 9, wherein an equation for calculating the multi-frame prediction error $MPE_{i,j}^{t}$ is represented as follows:

$$MPE_{i,j}^{t} = \sum_{k=t-n}^{t+n} w^{|k-t|} \cdot PE_{i,j}^{t}$$

where t denotes a time, w denotes a weight, and $PE_{i,j}^{t}$ denotes a prediction error.

* * * * *